(12) United States Patent
Oldervoll

(10) Patent No.: US 9,140,383 B2
(45) Date of Patent: Sep. 22, 2015

(54) SYSTEM FOR SUBSEA CABLE INSTALLATION

(75) Inventor: Magne Oldervoll, Os (NO)

(73) Assignee: OCTIO AS, Bergen (NO)

( * ) Notice: Subject to any disclaimer, the term of this patent is extended or adjusted under 35 U.S.C. 154(b) by 0 days.

(21) Appl. No.: 13/699,802

(22) PCT Filed: Jul. 12, 2010

(86) PCT No.: PCT/IB2010/053172
§ 371 (c)(1),
(2), (4) Date: Nov. 26, 2012

(87) PCT Pub. No.: WO2012/007790
PCT Pub. Date: Jan. 19, 2012

(65) Prior Publication Data
US 2013/0115006 A1 May 9, 2013

(51) Int. Cl.
*F16L 1/12* (2006.01)
*F16L 1/16* (2006.01)
*H02G 1/10* (2006.01)
*E02F 5/10* (2006.01)
*E02F 9/20* (2006.01)

(52) U.S. Cl.
CPC .............. *F16L 1/165* (2013.01); *E02F 5/105* (2013.01); *E02F 5/106* (2013.01); *E02F 5/109* (2013.01); *E02F 9/2016* (2013.01); *H02G 1/10* (2013.01)

(58) Field of Classification Search
CPC ............ H02G 1/10; E02F 5/104; B63B 35/04
USPC ......... 405/158, 159, 160, 164, 165, 161, 163, 405/180; 37/313, 367, 345, 346; 13/158, 13/159, 160, 164, 165, 161, 163, 180
See application file for complete search history.

(56) References Cited

U.S. PATENT DOCUMENTS

| | | | |
|---|---|---|---|
| 4,129,992 A | 12/1978 | Carlsson | |
| 5,624,207 A * | 4/1997 | Berges | ............................ 405/173 |
| 5,722,793 A | 3/1998 | Peterson | |
| 6,350,085 B1 | 2/2002 | Bath | |
| 6,705,029 B2 * | 3/2004 | Anderson | ........................ 37/323 |
| 6,988,854 B2 * | 1/2006 | Porter | ............................ 405/165 |
| 2005/0276665 A1 | 12/2005 | Entralgo | |

(Continued)

FOREIGN PATENT DOCUMENTS

| | | |
|---|---|---|
| DE | 4023762 A1 | 1/1992 |
| JP | 57036228 A | 2/1982 |

(Continued)

*Primary Examiner* — Doug Hutton, Jr.
*Assistant Examiner* — Patrick Lambe
(74) *Attorney, Agent, or Firm* — Jeffrey S. Melcher; Manelli Selter PLLC

(57) ABSTRACT

The present invention relates to a system for subsea installation of elongate flexible element, comprising a container for allocating/storing/accommodating an elongate flexible element intended to be installed, said container being positioned on a trenching vehicle arranged to trench said elongate flexible element into the seabed, which container comprises a guide system arranged to control the release of the flexible element, and which trenching vehicle is further linked to a surface vessel via an umbilical cable whereby said vehicle is remotely operable subsea from said surface vessel wherein said guide system comprises a coiling arrangement for keeping the elongate flexible element in a defined coiled configuration inside said container.

19 Claims, 5 Drawing Sheets

(56) References Cited

U.S. PATENT DOCUMENTS

2007/0248417 A1* 10/2007 Berg .......................... 405/158
2010/0034591 A1 2/2010 Wilson

FOREIGN PATENT DOCUMENTS

| JP | 2276411 A | 11/1990 |
| NO | 324824 B1 | 10/2007 |

* cited by examiner

SYSTEM FOR SUBSEA CABLE INSTALLATION

TECHNICAL FIELD

The present invention relates to a system for subsea cable installation, comprising a container for allocating/storing/accommodating a cable intended to be installed, said container being connected to a trenching vehicle for trenching said cable into the seabed, which container comprises a guide system arranged to control the release of the cable and which container is further linked to a surface vessel via an umbilical cable wherein said container is remotely operable subsea from said surface vessel.

BACKGROUND ART

Underwater deployment and trenching of cable are nowadays common procedures practiced by many operators for instance when permanently installing optic, power and/or seismic cables offshore. Typically a cable is continuously deployed and submerged into the water column from a surface vessel such as a barge, a DP vessel or any other ship, pontoon or platform. A remotely operated underwater vehicle (ROV) at the ocean bottom is maneuvered from the vessel and is used for burying the cable into the seabed.

Seismic cables are typically designed as one long cable being interrupted by numerous sensor stations/sensor points for instance geophones or hydrophones for instance intended for seismic surveillance of deep water hydrocarbon reservoirs.

For cables in general, and seismic cables in particular, it is very challenging to deploy cable from the vessel all the way to the ocean floor without exposing it to too much mechanical strain which could damage the structure and components. This is especially a problem at deep waters where the distance from the surface to the seabed may be several thousand meters which of course leads to very high loads (e.g. from water currents, turbulence and/or vessel heave) acting on the cable hanging from the deck. It has therefore been suggested to arrange the cable on a reel and/or inside a cage prior to lowering it into the water and onto the ocean bottom whereat the cable is unwound and trenched e.g. by a ROV. However such a solution brings a risk that the cable will get tangled during unwinding, and/or that the seismic stations get trapped in between layers of cable and get damaged.

U.S. Pat. No. 6,350,085 discloses a cable deployment system wherein a section of a cable intended to be trenched is placed inside a drum, and another section of the cable act as a riser cable section whereby which the drum may be submersed from the vessel to the sea floor. The drum forms part of an integrated transportation and deployment system and is fitted onto a stinger for conducting the cable from the drum onto the sea bottom.

Another system and method for deploying and retrieving a cable is shown in US 2005/0276665 where the cable is wound upon a reel positioned inside a cage, which cable is arranged to be buried by a ROV.

However, also these two concepts will only reduce the problem, not eliminate it.

DISCLOSURE OF THE INVENTION

The object of the present invention is to provide an improved system for laying/trenching cable at the sea floor in deep water for various purposes, in particular seismic cables comprising seismic sensor modules, where said system enables for controlled deployment and trenching, with minimised mechanical strain on the cable and where the risk of tangled cable is substantially avoided.

The objects of the present invention are achieved by a system for subsea installation of elongate flexible element (e.g. a cable), comprising a container for allocating an elongate flexible element intended to be installed, said container being arranged on a trenching vehicle for trenching said elongate flexible element into the seabed, which container comprises a guide system arranged to control the release of the flexible element (underwater), and which container is further linked to a surface vessel via an umbilical cable whereby said container is remotely operable subsea from said surface vessel, and wherein said guide system comprises a coiling arrangement for keeping the elongate flexible element in a defined coiled configuration inside said container.

It is to be understood that said container could be any kind of container, cage, basket or other type of storage container which is suitable for allocating a cable element in a defined coiled configuration according to the invention.

The coiling arrangement enables easy coiling of all types of cables, including seismic cables possibly also comprising sensor modules which may be asymmetrically arranged and which normally are difficult to coil since the modules get stuck in between cable sections leading to tangling.

Thanks to the invention where the cable is allocated inside the container in an predetermined ordered arrangement there is achieved a way of performing a problem free unloading of a cable from the container to the trenching vehicle where entangling of the cable is avoided, and where the cable may be pulled out from the container without any high tensions in the cable leading to minimised risk of damages. Also, since the entire cable to be installed is accommodated inside the container until trenching is commenced, the damage risk due to that mechanical strain is eliminated.

When using the cable laying system according to the present invention the weight of the trenching vehicle, including the container and the cable, will be quite significant, even as much as 10-20 tons. In some areas the seabed is very soft, and will not support the load of the vehicle. For that reason, and also for reducing the load on the umbilical cable during deployment of the vehicle, buoyancy is needed on the trenching vehicle. Known solutions include for instance attach buoyancy elements made from syntactic foam to the vehicle. However, this gives a fixed buoyancy, and it is not possible to adjust the buoyancy for changing seabed conditions or the fact that the load decrease as the cable is laid out on the seabed, and the buoyancy should therefore be reduced to maintain a constant load on the seabed. This problem is solved in that the trenching vehicle according to the invention may be equipped with buoyancy members, preferably in the form of ballast tanks filled with compressed air.

According to one aspect of the invention the ballast tanks comprise a pressure equal to the seawater pressure at the given depth in order to properly balance the trenching vehicle.

According to another aspect of the invention each of said buoyancy member/s comprise at least one outlet which is open to the surrounding, allowing for water to enter into the buoyancy member when submerged.

According to yet another aspect of the invention said tanks are connected to the surface vessel via a high compression air hose for providing said tanks with compressed air.

According to another aspect of the invention the buoyancy members may be divided into several compartments, with individual air flow control. This can be used to control the stability of the vehicle, and uneven offloading of cable can be compensated by the ballast/buoyancy system.

According to one aspect of the invention said elongate flexible element is a seismic cable, possibly comprising at least one sensor module integral with the element, preferably at least two sensor modules being spaced from each other and interconnected via said cable. The coiling arrangement will provide specific advantages for seismic cables, since these types of flexible elements are quite sensitive to e.g. mechanical strains and since sensor modules often leads to entanglement upon deployment. By being able to arrange the cable in a predetermined coiled configuration such problems are avoided and a comparably easy trenching is possible.

According to another aspect of the invention said coiling arrangement is positioned inside said container and comprises at least one inner strip profile arranged at the peripheral wall of the container, which strip profile comprises a plurality of retaining details for holding the elongate flexible member in a predetermined coiled position in relation to said peripheral wall of the container. The inner strip profile as well as the retaining details may be made out of plastic material, metal material or a combination thereof.

According to another aspect of the invention said retaining details are hook shaped and are arranged in an array upon the strip profile for withholding the elongate flexible element and keeping it loosely coiled in a predefined coiled configuration, preferably corresponding to the shape of a loose eight disposed inside the container, which will also be described more thoroughly in the detailed description.

According to yet another aspect of the invention the trenching vehicle comprises a plow-like digging device in its rear portion arranged to dig a groove in the seabed as the vehicle moves forward. According to the invention the cable is arranged to be pulled out from the container and buried in the groove made by the trenching vehicle.

According to yet another aspect of the invention said guide system further comprises a rotary sheave positioned between the coiling arrangement and the digging device, said sheave being arranged to carry said element and guide it from the inside of said container further to the digging device. According to one embodiment said sheave comprises a circumferential groove fitting the element that is carried by the sheave.

In the present context, the term "sheave" is used to designate a wheel or roller with a groove along its edge for guiding a cable or similar elongate flexible element while changing the running direction of the cable or other element.

According to yet another aspect of the invention said container is replaceable meaning when a cable from a first container is used up and has been trenched a second container, provided with new cable, may replace the empty container so that cable installation can proceed substantially without any interruption. Such replacement of containers may for instance be carried out by a ROV, which can also be used for connecting cables by stabbing wet mate connectors. Evidently the whole installation may be assisted and monitored by a standard work class Remote Operated Vehicle (ROV).

A system according to anyone of the previous claims, wherein said container comprises a length between 4-8 m, a width between 2-3 m and a height between 1-2 m.

Further details characterizing the present invention will be disclosed below.

BRIEF DESCRIPTION OF THE DRAWINGS

In the following, the invention will be described in more detail with reference to preferred embodiments and the appended drawings.

FIG. 6b is an end view of the trenching vehicle supporting a container of FIG. 6a.

DETAILED DESCRIPTION OF THE INVENTION

Figure 1:
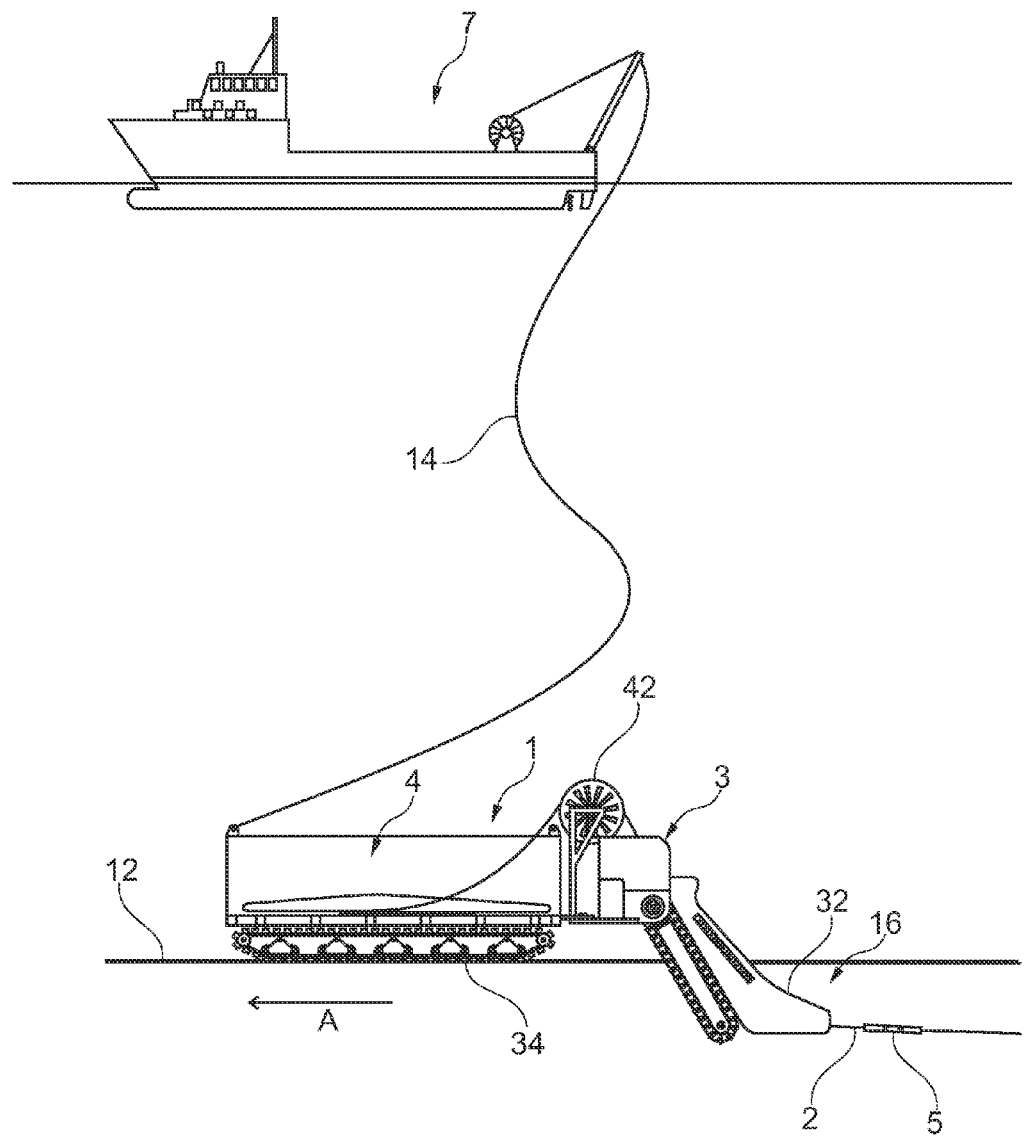
FIG. 1 is a schematic side view of a vessel linked to a trenching vehicle for installing an elongate flexible subsea element.

Referring first to FIG. 1 there is seen a non-limiting schematic side view of a system for subsea installation of elongate flexible element 2 according to a preferred aspect of the invention, wherein a surface vessel 7 is linked to a submersed trenching vehicle 3 via an umbilical cable 14. The umbilical cable 14 supply electric power to the vehicle 3, and provides a telemetry link for control and monitoring of vehicle and its functions so that the trenching vehicle 3 is remotely operable subsea from said surface vessel 7. Further, the trenching vehicle 3 is provided with a container 1 allocating an elongate flexible element 2 intended to be installed into the seabed 12. The elongate flexible subsea element may be a seabed pipe or a cable, such as a seismic cable, for example, having sensor modules 5 distributed rather densely along the cable. Hereinafter said elongate flexible element 2 will be referred to as "cable". Said sensor modules form an example of an accessory 5 that is integral with the elongate flexible element, but the accessories are not restricted to such sensor modules.

Figure 2A:
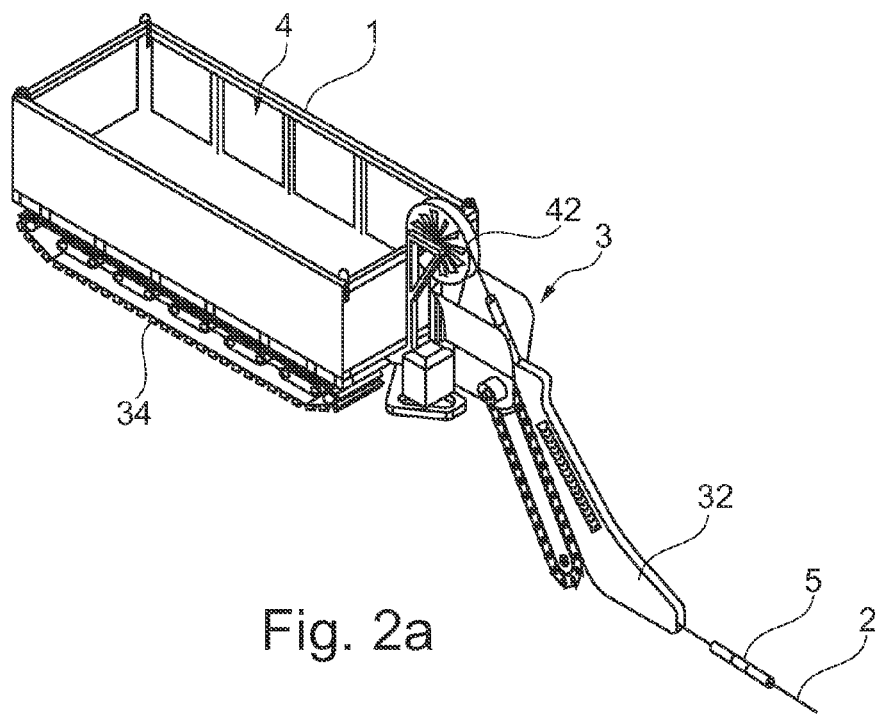
FIG. 2a is a perspective view showing a trenching vehicle supporting a container according to one embodiment of the invention.
Figure 2B:
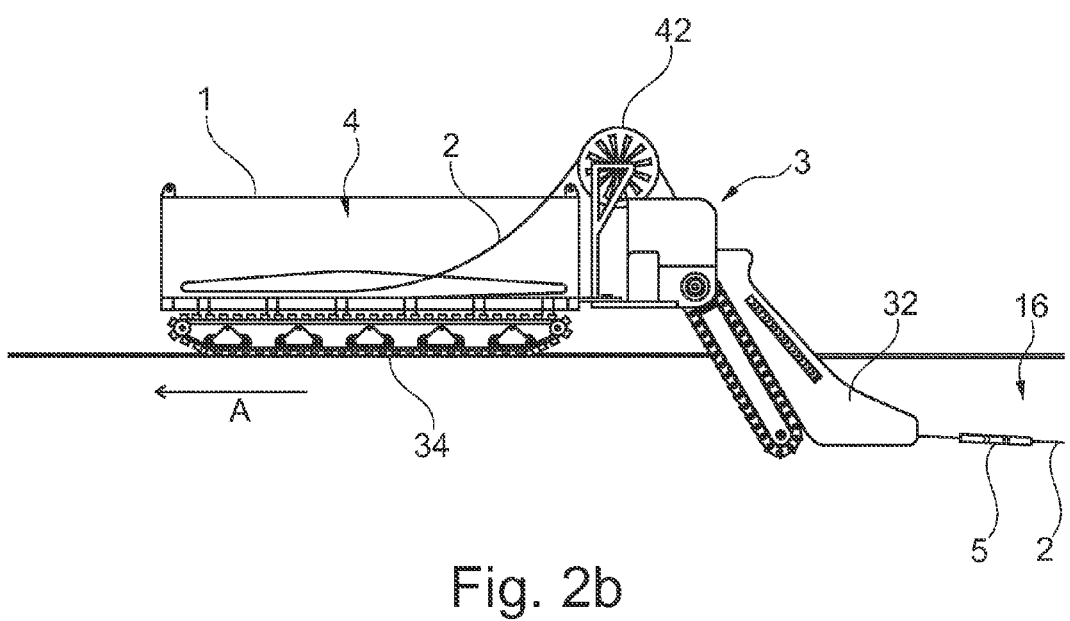
FIG. 2b is a schematic side view of a trenching vehicle supporting a container.

In FIG. 1 the trenching vehicle 3 is in an operational mode moving in a forward direction indicated with arrow A continuously digging a groove 16 in the seabed 12 while trenching the cable 2 into the groove. The container 1 is seen in cross section, displaying its inside whereat there is arranged a guide system 4 arranged to control the release of the flexible element 2, e.g. cable 2. As will become more clear in connection to FIGS. 4a-c the guide system 4 comprises a coiling arrangement 40 for keeping the elongate flexible element 2 in a defined coiled configuration inside said container 1. As is also seen in the perspective view of FIG. 2a and the side view of FIG. 2b the trenching vehicle comprises a plow-like digging device 32 in its rear portion arranged to dig a groove 16 in the seabed 12 as the vehicle moves forward A by means of conveyor belts 34. The plow-like digging device 32 may be any conventional trenching sward and function according to known practice.

The guide system/guiding system 4 preferably comprises a support structure 42 arranged to contribute to passing the cable 2 from the inside of the container 1 to the digging device 32. According to one embodiment of the invention the support structure is a guiding member 42 positioned between the coiling arrangement 40 and the digging device 32, said member 42 being arranged to carry said cable 2 and guide it from the inside of said container 1 where it is coiled in a predetermined ordered configuration, and further to the digging device 32 whereat there is also arranged a pulling device (not shown) for pulling the cable out from the container 1 and feeding it into the groove 16, via the digging device 32, whereat the cable is buried.

In its simplest version the guiding member 42 is a passive structure for supporting the cable as it passes from the container to the trench: during operational mode the first end of cable 2 will be secured in the trench 16, and the cable is pulled out automatically as the vehicle moves along forward. A more advanced option is to make the guiding member 42 as a motorized sheave wheel, feeding the cable into the trench. The sheave 42 preferably comprises a circumferential groove 48 fitting the elongate element 2 for continuous support while carrying the cable and passing it to the digging device 32.

Figure 3:
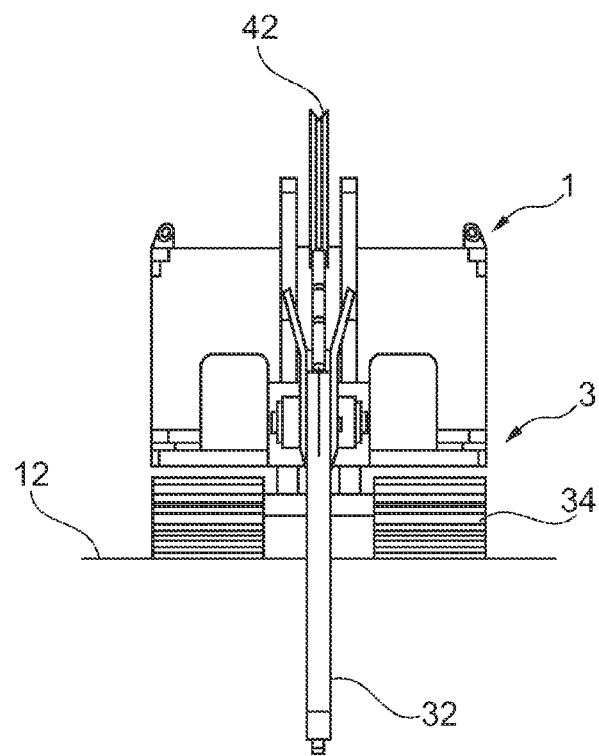
FIG. 3 is an end view of the trenching vehicle supporting a container of FIG. 2, FIGS. 4a-b show schematically detailed top-views of two different containers comprising coiling arrangements according to the invention.

The method of a typical underwater installation of an elongate flexible element 2 into the seabed according to the invention is now to be described, referring mainly to FIGS. 1-3. First, there is provided an underwater trenching vehicle 3 for trenching an elongate flexible element 2 into the seabed 12 from a vessel 7, according to common practice within subsea vehicle operations. A container 1 according to the invention is provided which accommodates an elongate flexible element 2, i.e. a cable 2. The container 1 is provided with a guide system 4 with a coiling arrangement 40 for keeping the elongate flexible element 2 in a defined coiled configuration inside said container 1. The guide system 4 also provides the possibility of a controlled and predictable release of the flexible element 2 from the container 1 during cable laying operation, leading to that the risk of tangling during cable deployment is significantly reduced. It is to be understood that the container 1 may either be provided onto the vessel 7 with a cable 2 already arranged therein, or a cable 2 may be installed into the container 1 directly onboard by means of manual assistance. The container 1 accommodating a cable 2 to be trenched is then to be releasably positioned onto a trenching vehicle 3 modified to receive a container 1 according to the invention. Said trenching vehicle 3 is linked to the vessel 7 via an umbilical cable 14 thereby allowing for the trenching vehicle 3 to be remotely operable subsea from the surface vessel 7.

The trenching vehicle 3 and the thereupon arranged container 1 are transferred from the vessel 7 overboard through the water column to the seabed 12, whereat the digging device 32 of the ROV is activated commencing to digging a groove 16. At this point the pulling device (not shown) engages one end portion of the elongate cable 2 drawing it out from the container 1, and pulling it out from coiling arrangement 40 therein, over the rotary sheave 42 and further through the digging device 32 into the groove 16 where it is laid out. Simultaneously to permanently installing the cable 2, the trenching vehicle 3 is moving in a forward direction A for continuously disposing the cable 2 into said groove 16. Trenching operation proceeds until the whole length of the cable 2 has been laid out and the container 1 is empty. If further cable installation is desired the empty container 1 may be replaced on spot with a new container carrying more cable 2, for instance by a standard work class Remote Operated Vehicle (ROV). Replacement procedure of empty container includes connecting the old cable section with the new one, preferably by means of stabbing wet mate connectors; a process which may be carried out by said ROV according to common practice.

Figure 4A:
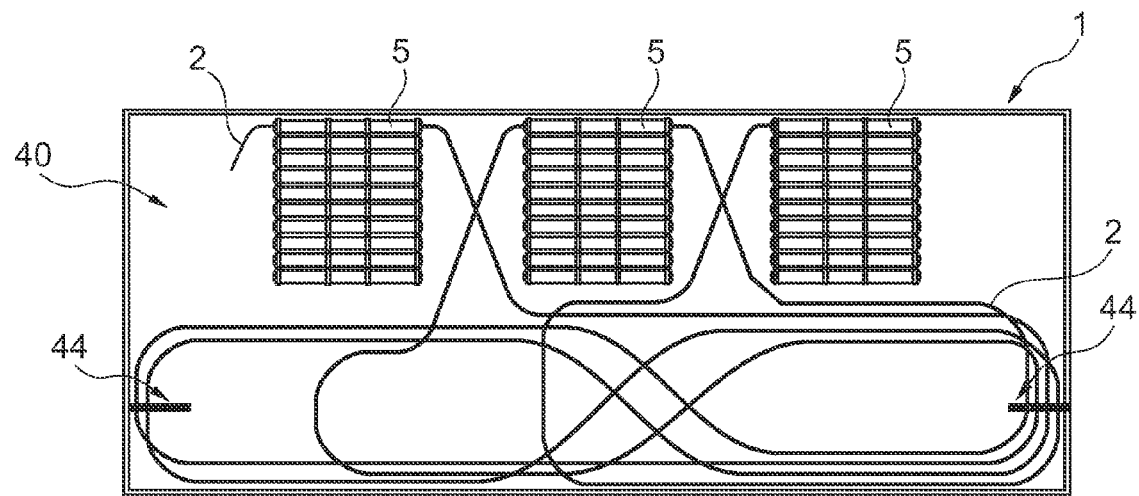
FIG. 4c is a side view showing the inside of a container according to one embodiment of the invention.
Figure 4B:
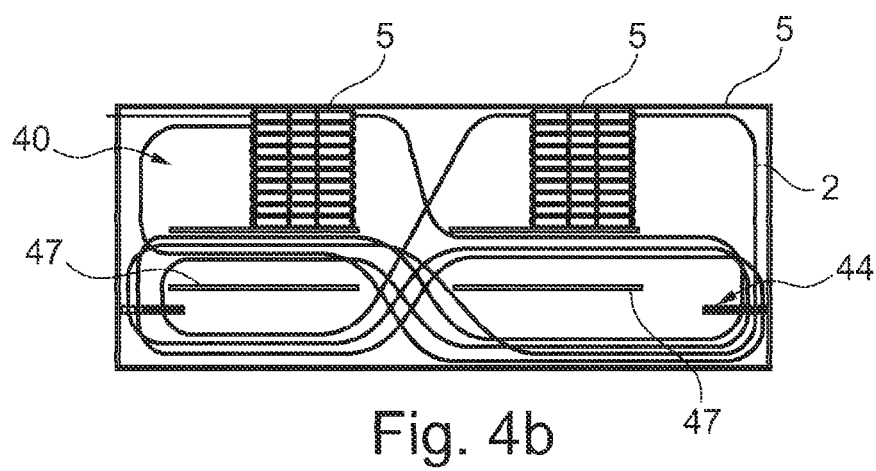
Figure 4C:
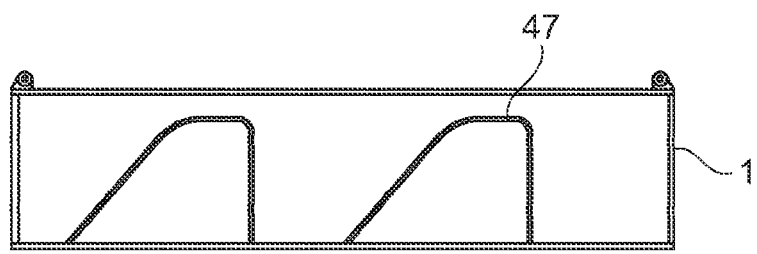

Referring now mainly to FIGS. 4*a-c* there are shown examples of the inside of a container 1 according to the invention, comprising a coiling arrangement 40 positioned inside the container 1 arranged to allocate, in an ordered configuration, an elongate flexible element 2, e.g. a cable section 2.

Figure 5A:
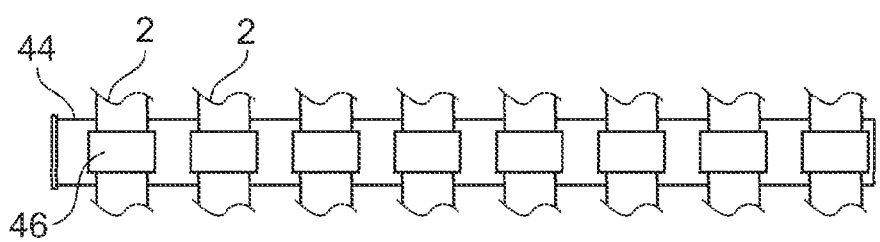
FIG. 5a is a planar top view of a strip profile holding an elongate flexible element according to one embodiment of the invention.
Figure 5B:
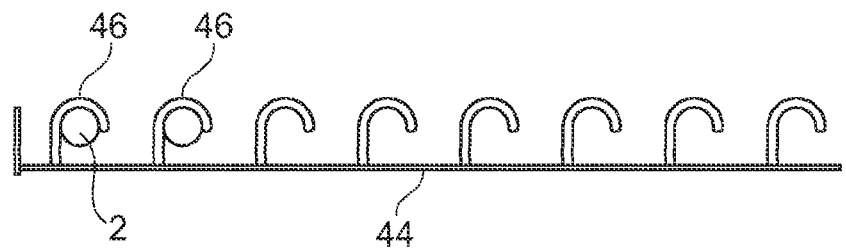
FIG. 5b is a planar side view of the strip profile in FIG. 5a, and FIG. 6a is a side view schematically showing a trenching vehicle according to yet another embodiment of the invention supporting a container.

FIG. 4*a* illustrates, from a top view, the inside of a container 1 comprising said coiling arrangement 40, which according to this example includes at least one inner strip 44 profile, preferably more than one strip profile 44 intended for keeping the elongate element 2 in a predetermined configuration (see also FIGS. 5*a-b*). In the present example the elongate element/cable 2 comprises a number of accessories 5 integral with the element and being spaced from each other and interconnected via said flexible element 2. The accessories may for instance be seismic sensor modules 5 intended for performing seismic measurements. As is seen in FIG. 4*a* the elongate element 2 is coiled horizontally within the container 1, preferably in the shape of a loose eight, with the accessories arranged in such a way juxtaposed/side by side at one side of the container 1. A loose wounding of the cable 2 ensures a minimum of bending forces upon coiling which would otherwise risk to damage the cable structure. Also, keeping the cable 2 inside the container 1 until the very moment of trenching it into the sea floor protects it from unnecessary wear and tear. The design of the container 1 and the coiling arrangement 40 further yields a systematic packing arrangement for the cable array 2 with the sensor modules 5 safely placed in prepositioned regions and in a predetermined ordered arrangement.

Another embodiment according to the invention is seen in FIG. 4*b*, representing the same view as FIG. 4*a*, only displaying another type of coiling arrangement 40. In this embodiment the coiling arrangement 40 comprises said strip profiles 44, and also centrally positioned guide walls 47 having the purpose of withholding the stacks of sensor modules 5 and also to support the loose eight configuration of the cable segment coiled inside the container 1. The guide walls 47 are further shown in FIG. 4*c*, wherein is seen the side profile of said guide walls. Evidently the shape of the guide walls 47 may vary, however the shown example in FIG. 4*c* provides the advantage that a cable 2 may easily slide on the oblique portion upon release from the container 1 during trenching operation.

An exemplary embodiment of a strip profile 44 is shown from a top view in FIG. 5*a* and a side view in FIG. 5*b*, withholding a cable element 2. The strip profiles 44 are preferably arranged at the peripheral wall of the container 1, and comprise a plurality of retaining details 46 for holding the elongate flexible element 2 in a predetermined coiled position in relation to said peripheral wall of the container 1. The retaining details 46 may be hook shaped as in FIGS. 5*a-b* and are arranged in an array upon the strip profile 44 for withholding the elongate flexible element 2 and keeping it loosely coiled in a defined coiled configuration inside said container 1, preferably in a configuration corresponding to the shape of a loose eight. Evidently there may be arranged several strip profiles 44 next to each other at the inner wall of the container 1, either placed above each other or next to each other depending on the desired coiling disposition within the container 1.

The container is preferably rectangular as is displayed in the appended figures, however it is obvious that the container may have another shape if desired (e.g. cylindrical, oval or squared), if such shape would be beneficial due to storage reasons or in order to facilitate adaption to a certain trenching vehicle 3.

Preferably the container 1 comprises a length l between 4-8 m, a width w between 2-3 m and a height h between 1-2 m.

Figure 6A:
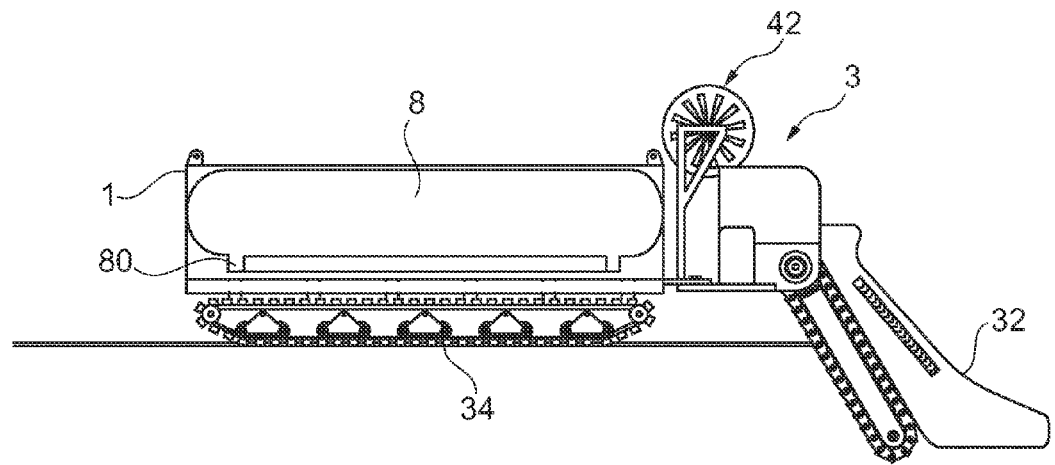
Figure 6B:
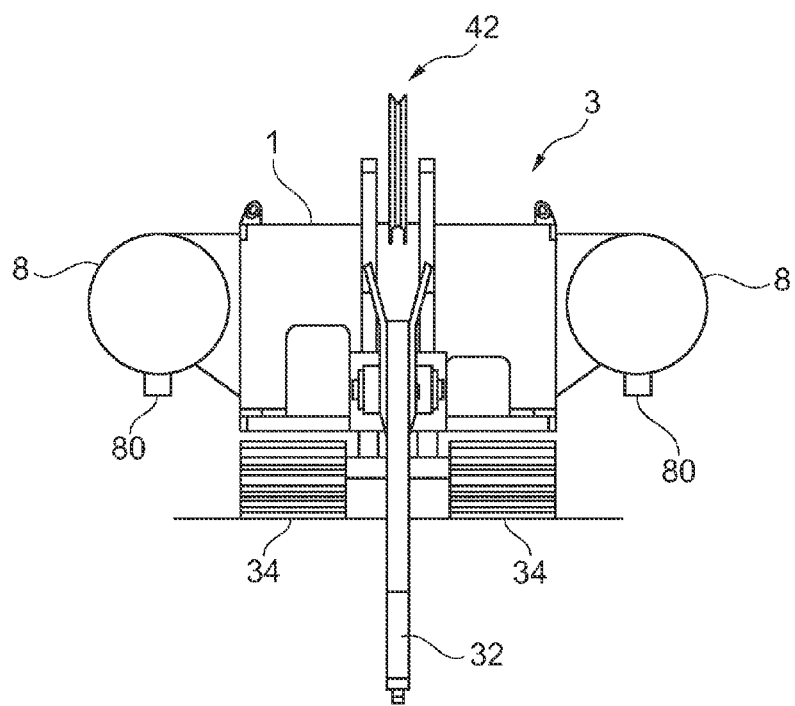

In FIGS. 6a-b there is seen yet another embodiment of a trenching vehicle 3 supporting a container 1 according to the invention; FIG. 6a showing the trenching vehicle 3 from a side view and FIG. 6b showing the trenching vehicle 3 from a rear view. The trenching vehicle according to the shown embodiment may be equipped with buoyancy members 8, preferably in the form of ballast tanks filled with compressed air. According to one aspect of the invention the ballast tanks 8 comprise a pressure equal to the seawater pressure at the given depth. The air pressure may be adjusted by simply letting air in or out of the tank via an air hose (not shown), for instance built into the umbilical cable 14, leading to the surface vessel 7. At the surface vessel said air hose (not shown) may be connected to a high pressure air compressor. In order to secure that the pressure in the tank is equal to the seawater pressure the thanks preferably include large outlets 80 at the lowest points of the tanks. This allows water to flow into the tank 8 and reduce the buoyancy when the pressure is reduced, and squeeze the water out when the pressure is increased. The tank outlets 80 are preferably large relative to the maximum air flow, thereby the pressure difference will never be significant. Further, the tanks may for instance be made from relatively thin aluminium sheets.

The buoyancy members may be divided into several compartments, with individual air flow control. This can be used to control the stability of the vehicle, and uneven offloading of cable can be compensated by the ballast/buoyancy system.

The skilled person realizes that a large variety of modifications may be performed without the use of inventive skill, departing from the description above, e.g. varying the position of the profiles 44 in order to modify the alignment of the cable 2 to be accommodated within the container 1.

Many modifications and other embodiments of the inventions set forth herein will come to mind to one skilled in the art to which these inventions pertain having the benefit of the teachings presented in the foregoing descriptions and the associated figures. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for underwater installation of a seismic cable having a plurality of integrated seismic sensors into the seabed, comprising the steps of:
   a. providing an underwater trenching vehicle for trenching the seismic cable a plurality of seismic sensors integrated with a cable into the seabed;
   b. providing a container for accommodating the seismic cable which container comprises a guide system arranged to control the release of the seismic cable from the container, the seismic cable being horizontally coiled within the container;
   c. removably mounting the container upon said trenching vehicle;
   d. linking the trenching vehicle to a surface vessel via an umbilical cable whereby the trenching vehicle is remotely operable subsea from said surface vessel;
   e. transferring the trenching vehicle and the thereupon arranged container from the vessel to the seabed;
   f. providing said guide system with a coiling arrangement comprising a plurality of retaining details for keeping the seismic cable in the horizontal coiled configuration inside said container;
   g. deploying the seismic cable from the coiling arrangement within the container by using the guide system to pull the seismic cable from the container and through a top of the container so that the cable uncoils from within the container while the container remains stationary in relation to the trenching vehicle; and
   h. using the trenching vehicle to permanently trench and install the seismic cable into the seabed.

2. The method according to claim 1, wherein said coiling arrangement is positioned inside said container and comprises at least one inner strip profile arranged at the peripheral wall of the container, which strip profile comprises the plurality of retaining details for holding the seismic cable in the horizontally coiled position in relation to said peripheral wall of the container.

3. The method according to claim 2, wherein said retaining details are hook shaped and are arranged in an array upon the strip profile for withholding the seismic cable and keeping the seismic cable loosely coiled in the horizontally coiled configuration inside said container.

4. The method according to claim 1, wherein the trenching vehicle comprises a plow-like digging device in a rear portion of the trenching vehicle, and further comprising using the digging device to dig a groove in the seabed as the vehicle moves forward.

5. The method according to claim 4, wherein said guide system further comprises a rotary sheave positioned between the coiling arrangement and the digging device, said sheave being arranged to carry the seismic cable and guide the seismic cable from the inside of said container to the digging device.

6. A system for subsea installation of a seismic cable having a plurality of integrated seismic sensors, comprising:
   a container for allocating/storing/accommodating the seismic cable comprising a plurality of seismic sensors integrated with a cable for installation over offshore oil and gas fields, said container being removably mounted on a trenching vehicle arranged to trench said seismic cable into the seabed, which container comprises a guide system arranged to control the release of the seismic cable, and which trenching vehicle is further linked to a surface vessel via an umbilical cable whereby said vehicle is remotely operable subsea from said surface vessel wherein said guide system comprises a coiling arrangement comprising a plurality of retaining details for keeping the seismic cable in a horizontally coiled configuration inside said container, wherein said container is constructed with a top opening through which the seismic cable is withdrawn from the container, and the guide system is constructed to pull the seismic cable from the container such that during installation the seismic cable is pulled from the container through the top of the container while the container remains stationary in relation to the trenching vehicle.

7. The system according to claim 6, wherein said coiling arrangement is positioned inside said container and comprises at least one inner strip profile arranged at the peripheral wall of the container, which strip profile comprises the plurality of retaining details for holding the seismic cable in the horizontally coiled position in relation to said peripheral wall of the container.

8. The system according to claim 7, wherein said retaining details are hook shaped and are arranged in an array upon the strip profile for withholding the seismic cable and keeping the seismic cable loosely coiled in the horizontally coiled configuration inside said container.

9. The system according to claim 6, wherein said horizontally coiled configuration corresponds to the shape of a loose eight.

10. The system according to claim 6, wherein the trenching vehicle comprises a plow-like digging device in a rear portion of the trenching vehicle arranged to dig a groove in the seabed as the vehicle moves forward.

11. The system according to claim 10, wherein said guide system further comprises a rotary sheave positioned between the coiling arrangement and the digging device, said sheave being arranged to carry the seismic cable and guide the seismic cable from the inside of said container to the digging device.

12. The system according to claim 6, wherein said container is replaceable.

13. The system according to claim 6, wherein said installation is assisted and monitored by a standard work class Remote Operated Vehicle.

14. The system according to claim 6, wherein said container comprises a length between 4-8 m, a width between 2-3 m and a height between 1-2 m.

15. The system according to claim 6, wherein said trenching vehicle comprises at least one buoyancy member.

16. The system according to claim 15, wherein said at least one buoyancy member comprises at least one tank arranged to be filled with compressed air.

17. The system according to claim 16, wherein said at least one buoyancy member comprises at least one outlet.

18. The system according to claim 16, wherein said tank is connected to the surface vessel via a high compression air hose for providing said tank with compressed air.

19. The system according to claim 16, further comprising at least two buoyancy members divided into several compartments, with individual air flow control.

\* \* \* \* \*